United States Patent [19]

Heins

[11] Patent Number: 5,596,437
[45] Date of Patent: Jan. 21, 1997

[54] X-RAY DEVICE

[75] Inventor: Erich-Jürgen Heins, Uetersen, Germany

[73] Assignee: U.S. Philips Corporation, New York, N.Y.

[21] Appl. No.: 194,300

[22] Filed: Feb. 8, 1994

[30] Foreign Application Priority Data

Feb. 9, 1993 [DE] Germany .......................... 43 03 643.0

[51] Int. Cl.⁶ .................................................. H04B 10/10
[52] U.S. Cl. ........................... 359/144; 359/147; 359/159
[58] Field of Search .................................... 359/172, 174, 359/159, 142, 144, 147

[56] References Cited

U.S. PATENT DOCUMENTS

| | | | |
|---|---|---|---|
| 4,649,385 | 3/1987 | Aires | 359/144 |
| 4,775,928 | 10/1988 | Kendall et al. | 364/200 |
| 4,809,257 | 2/1989 | Gantenbein | 359/176 |
| 4,812,842 | 3/1989 | Bayerlein | 359/172 |
| 4,962,466 | 10/1990 | Revesz | 359/172 |
| 4,977,618 | 12/1990 | Allen | 359/172 |
| 5,109,222 | 4/1992 | Welty | 359/142 |

FOREIGN PATENT DOCUMENTS

| | | | |
|---|---|---|---|
| 0361585 | 4/1990 | European Pat. Off. | 359/147 |
| 0259029 | 12/1985 | Japan | 359/147 |
| 0216634 | 8/1989 | Japan | 359/172 |
| 4079622 | 3/1992 | Japan | 359/142 |
| 2166328 | 4/1986 | United Kingdom . | |
| 2204426 | 11/1988 | United Kingdom | 359/144 |

OTHER PUBLICATIONS

Nakata, "In House Wireless Communication System Using Infrared Radiation" International Conference on Computer Communication pp. 333–338, Nov. 1985.

Yen, "The Use of Directed Optical Beams in Wireless Communications" IEEE Globecom 1985, New Orleans, Dec. 2–5, 1985 pp. 1181–1184.

Helliwell, "Wireless LANs: Coming to an Office Near You?", PC Week, Jul. 20, 1989 p. 20.

Gantz, "Preventing Wiring Entanglements with Satellite Infrared Network", Info World, Jul. 24, 1989.

82526 Serial Communications Controller Architectural Overview, Intel.

*Primary Examiner*—Leslie Pascal
*Attorney, Agent, or Firm*—Jack D. Slobod

[57] ABSTRACT

The invention relates to an X-ray device including a number of components to each of which is assigned a data transmission node working by the CAN protocol whose data input and data output are in mutual communication with other data transmission nodes via transmitters and receivers, the data transmission nodes being connected to the relevant associated components through connection lines. A fast and reliable data transmission is safeguarded in that the transmitter and receiver of at least some of the data transmission nodes are constructed for wireless transmission, and in that these transmitters or receivers are so controlled that they send data to at least the wireless receivers of other data transmission nodes and receive data from the wireless transmitters of at least the other data transmission nodes, as applicable.

8 Claims, 1 Drawing Sheet

X-RAY DEVICE

BACKGROUND OF THE INVENTION

1. Field of the Invention

The invention relates to an X-ray device comprising a number of components to each of which is assigned a data transmission node working by the CAN protocol whose data input and data output are in mutual communication with other data transmission nodes via transmitters and receivers, the data transmission nodes being connected to the relevant associated components through connection lines.

2. Description of the Related Art

Such an X-ray device is known from DE-A-40 25 834, corresponding to U.S. application Ser. No. 07/738395 to the same assignee as the present application.

The CAN protocol is known inter alia from the Intel publication "82526 Serial Communications Controller Architectural Overview"(ordering number: 270678001) and from the journal "Elektronik"(no. 25, 08.12.1989, pp. 79–83 and no. 12, 08.06.1990, pp. 109–114). In the CAN protocol, data are defined by the two logic levels "dominant" and "recessive". A dominant bit is obtained when one or several (data transmission) node(s) transmit(s) a dominant bit. A recessive bit is obtained only when all nodes generate such a bit. The information is coded in an NRZ code, i.e. the logic level does not change in the case of several consecutive bits of the same level.

According to the CAN protocol, each node can transmit data to each of the other nodes at any time (Multimaster principle) without having to wait for an authorization to transmit. The exchange of information accordingly takes place very quickly, which is essential for at least some components in an X-ray device.

According to the CAN protocol, each message (messages are also referred to as "communication objects" in the CAN protocol) comprises a so-called identifier which characterizes the nature of the data to be transmitted and which is transmitted following a start bit. When several data nodes start transmitting simultaneously, those nodes which transmit a recessive bit during transmission of the identifier, but which received a dominant bit, break off their transmission, so that only one data node is capable of transmitting the subsequent data of the message. Those nodes which received the data and test words of the transmitter correctly transmit an acknowledge signal (ACK signal) before the relevant transmitting node has ended a transmission. Those nodes which detect a faulty transmission transmit an error signal which causes all other nodes also to transmit an error signal and the transmitting node to break off the transmission and to repeat it. As a result, data nodes working in accordance with the CAN protocol have a high transmission speed as well as a high transmission reliability.

In the known X-ray device, the individual data transmission nodes are interconnected by means of optical waveguides combined into a loop. The time available for the transmission of a bit must be longer than the time required by the optical signal for reaching the last node in the loop jumping from node to node. The advantages of the high data transmission speed provided by the CAN protocol are partly wiped out again thereby. In the known device, moreover, difficulties may arise when an additional component is to be included in the x-ray device (in such a case an additional data transmission node must be included in the optical waveguide loop by means of additional waveguides), and when components perform strong movements relative to other components, because the associated data transmission nodes are in connection with the other data transmission nodes via optical waveguides.

SUMMARY OF THE INVENTION

The invention accordingly has for its object to provide an X-ray device of the kind mentioned in the opening paragraph which is so arranged that the number of components provided with a data transmission node or the spatial position of individual components can be changed in a simple manner while a high data transmission speed is maintained.

According to the invention, this object is achieved in that the transmitter and receiver of at least some of the data transmission nodes are constructed for wireless transmission, and in that these transmitters or receivers are so controlled that they transmit data to at least the wireless receivers of other data transmission nodes and receive data from the wireless transmitters of at least other data transmission nodes, as applicable.

The desired flexibility as to the number of data transmission nodes and the displacement possibility for individual components are achieved here by the wireless transmission, i.e. by a transmission without electrical conductors or optical waveguides. The high access speed to other nodes provided by systems according to the CAN protocol is maintained because each of the nodes transmitting in the wireless manner can reach each and any of the other nodes transmitting in the wireless manner at any time.

It should be noted here that the wireless data transmission is known in other technical fields.

Thus U.S. Pat. No. 4,775,928 discloses a system with a host computer which can enter into wireless communication with a portable terminal comprising a keyboard. The wireless transmission in this case takes place by means of high-frequency electromagnetic waves. Data put in at the terminal are transmitted to the host computer and transmitted back to the terminal by this computer, and only then are they displayed by the terminal; this two-way transmission reduces the transmission speed. When two or more terminals are provided, the host computer must communicate with these terminals by means of different security codes. This system is suitable only for data exchange between one central station and one or several satellite stations.

GB-PS 2,166,328, moreover, describes a home distribution system in which various stations, such as TV receiver, video recorder, stereo-radio combination, and at most one remote control unit per room can communicate with one another via a common ISDN bus. The (infrared) remote control unit here may enter into communication with other stations v/a an infrared adapter connected to the ISDN bus; the infrared connection between remote control unit and adapter accordingly only connects one transmitter to one receiver at a time. The data flow through the ISDN bus is controlled by a central unit so that only one of the stations connected to the bus can transmit data at any time. For this purpose, the central unit may, for example, call up the addresses of the stations one after the other. If the station called up at a given moment is ready to transmit, it transmits a (Service Request-SRQ) signal and subsequently receives authority to transmit from the central station. The relevant station then transmits its message, which contains inter alia the address of another station and a test word, and the addressed station transmits an acknowledge signal when the test word was correctly received. This process is suitable only for applications in which comparatively long waiting times are acceptable until the authority to transmit is given.

According to the invention, all data transmission nodes could in principle be provided with a transmitter and a receiver for wireless transmission. This, however, does not make sense in all cases. For components which are arranged close together and which do not change their relative positions, for example, the data transmission through lines is in general more suitable than wireless transmission because the former as a rule leads to a greater freedom from interference. A further embodiment therefore is characterized in that a wireless transmitter which can reach the other wireless receivers or a wireless receiver which can receive data from the other wireless transmitters is connected to a line bus system to which at the same time several data transmission nodes are connected.

Here, accordingly, there are two groups of nodes. The nodes of the one group are connected to the bus system, whereas the nodes of the other group are each connected to a wireless transmitter/receiver. A node from the one group comes into contact with a node from the other group via a wireless transmitter (at one of the nodes or at the bus) and a wireless receiver (at the bus or at one of the nodes). In such a case, the nodes of mobile or newly added components of the X-ray device will appropriately be provided with wireless transmitters and receivers, but the same holds for operating elements or display units. Similarly, this arrangement is suitable for the plugless connection of servicing or diagnostic systems to the data transmission nodes of the components of an X-ray device.

BRIEF DESCRIPTION OF THE DRAWING

The invention will be explained in more detail below with reference to the drawing, in which.

DETAILED DESCRIPTION OF THE PREFERRED EMBODIMENTS

Figure 1:
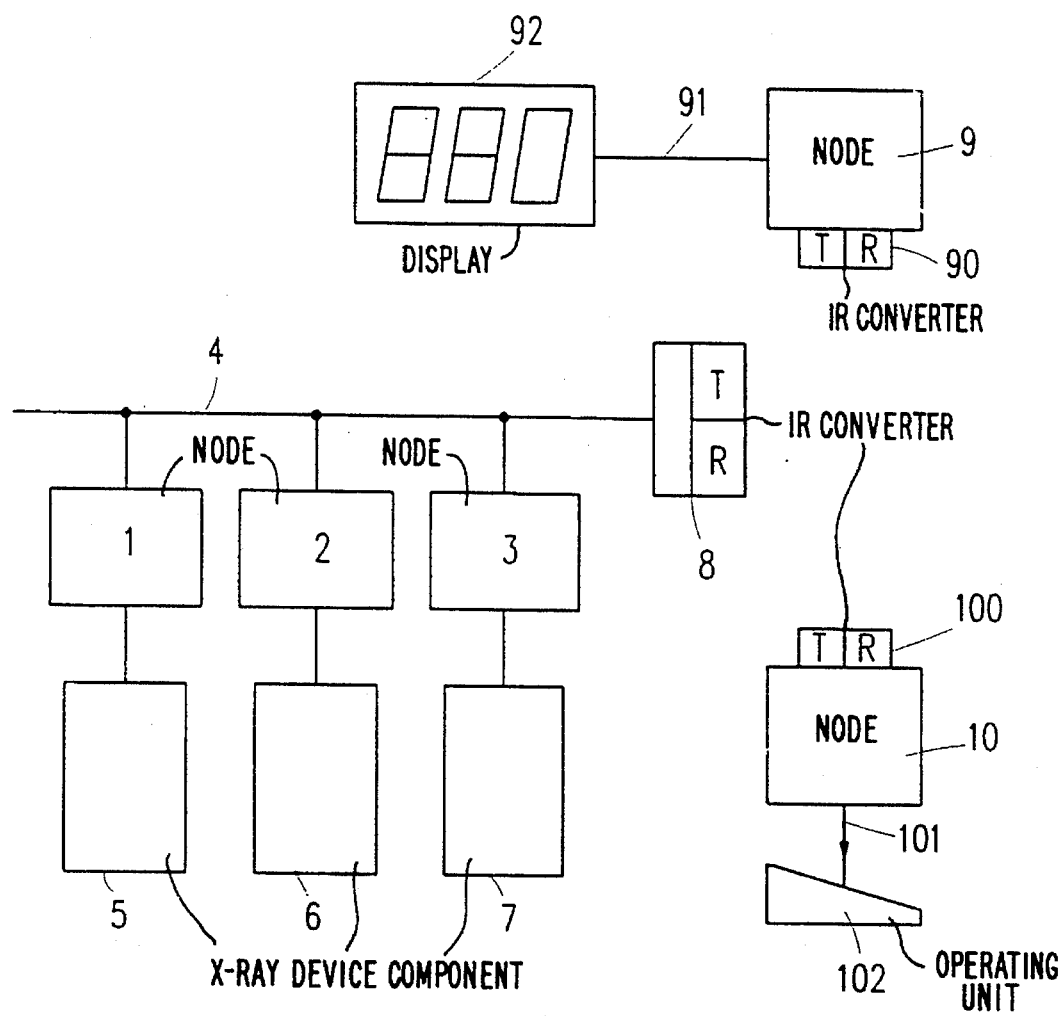
FIG. 1 is a block diagram of a portion of an X-ray device according to the invention.

Reference numerals 1, 2 and 3 in FIG. 1 denote three data transmission nodes whose data inputs and outputs are connected to a bus system 4. Each data transmission node is associated with a component of the X-ray device which is controlled by the relevant node. Thus a component 5 is connected to the node 1, for example a drive for tilting the tabletop of a patient table about a horizontal axis. A component 6 is associated with the node 2, for example a drive for shifting the tabletop in longitudinal direction, and the component 7 controlled by the node 3 may be a drive for shifting the tabletop in lateral direction. Further data transmission nodes are connected to the bus 4, each with its associated component of the X-ray device, but these units are not represented in the drawing.

In addition, the bus 4 is connected to an infrared converter 8. The infrared converter 8 comprises a transmitter T which converts the data on the bus into infrared signals, the infrared converter emitting light in the case of a dominant bit and no light in the case of a recessive bit. The infrared converter also comprises a receiver R which converts infrared signals into electrical signals on the bus.

Besides the group of nodes (1, 2, 3) connected to the line bus system 4, there is a further group of nodes. These nodes 9 and 10 are provided with infrared converters 90, 100 for wireless communication. Each infrared converter 90 or 100 comprises a transmitter T which is connected to a data output (not shown) of the node and with an infrared receiver R which is connected to a data input (not shown) of the node. The converters are so arranged that each transmitter can reach each receiver—with the exception of at most the receiver belonging to the same converter; however, it is advantageous when each infrared transmitter can also reach the infrared receiver in the same converter. The node 9 controls, for example, a display 92 through lines 91, while the node 10 is connected, for example, to an operating unit 102 through lines 101.

Figure 2:
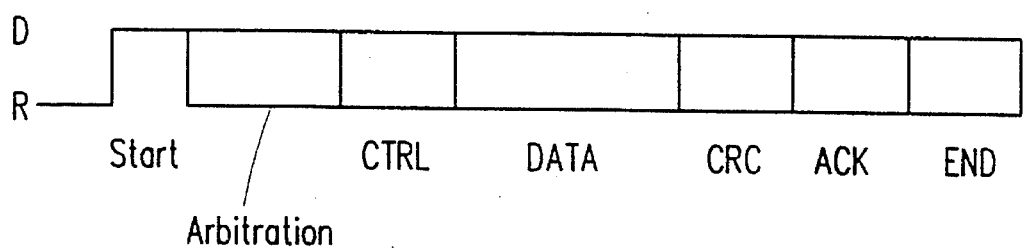
FIG. 2 shows a data arrangement in accordance with the CAN protocol.

The data transmission as usual in the CAN protocol will be explained below with reference to the example of the control of the patient table movement by means of the operating unit 102, it being assumed, for example, that the user has put in a command for the patient table movement into the operating unit 102. The associated infrared transmitter then transmits a message, a so-called communication object, which reaches all infrared receivers (with the exception of at most the infrared receiver present in converter 100) and whose data frame is depicted in FIG. 2. The data frame contains first a start bit, whose logic level (D) is dominant, i.e. the transmitter emits infrared radiation during the transmission of this bit.

The start bit is followed by an arbitration field with a length of twelve bits. The first eleven bits contain the "identifier" of the communication object which characterizes the data to be transmitted (but not the relevant node) and which serves inter alia to determine which communication object takes precedence in the case of several nodes transmitting simultaneously. Indeed, when several nodes start transmitting different messages simultaneously, all those nodes which transmit a recessive bit (no light) during the transmission of the identifier associated with their message but which had received a dominant bit (light), will discontinue their transmission. The only remaining node is the one which transmits the message of highest priority, whose identifier accordingly contains more high bits at the start than the identifiers transmitted by the other nodes.

This is followed by a control field (CTRL) of six bits, a data field of between 0 and 64 bits length, a testing field (cyclic redundancy check, CRC) of 16 bits, and a reception acknowledge field (ACK) which comprises two bits which are low for the transmitting node. Each node which has received the transmitted message free from errors, will transmit a dominant bit (light) during the second of these two bits, also when the message was not meant for this node. The relevant transmitting node will repeat its message when not at least one node acknowledges the correct reception or when a node sends an error signal (seven high bits); if not, the end of the message is signalled by means of a final data field comprising seven low bits.

After all nodes have received the message in this manner and acknowledged it as correct, the node(s) for which the message or communication object was meant will react, because the identifier of this communication object was laid down in a memory location in the node, in this case the node 1 which controls the drive 5 for the patient table movement.

During the patient table movement, the node may transmit a message about the patient table position at regular time intervals or, for example, when a particular position—for example, the horizontal position—has been reached, which message is transmitted by the transmitter of the infrared converter 8, reaches in the same manner as described above inter alia the receivers of the nodes 9 and 10, and causes the node 9 to show the transmitted patient table position on the display 92. Since the transmission reliability to the node 9 is safeguarded by the CAN protocol and since the control of the display unit 92 takes place via a line connection, it may be assumed that also in surroundings with interference sources the transmission reliability is guaranteed.

The X-ray device may also comprise more than two components which are controllable by means of messages transmitted by remote control to the associated nodes. Advantageously, the communication of those data transmission nodes with the remaining CAN system will be wireless. The components of which are mobile and/or which have a low power consumption, so that a battery is sufficient for operation and additional connections (apart from the connection to the relevant node) are not necessary. Testing or diagnostic units necessary for servicing purposes are advantageously coupled to the other components of the X-ray device by means of wireless signal converters or infrared transmitters and receivers.

I claim:

1. An X-ray device comprising a multiplicity of operative components which communicate automatically with each other and cooperate to form said X-ray device, a plurality of said operative components being controlled in response to control commands transmitted from other ones of said components and each of said operative components being assigned a data transmission node working by the Controller Area Network protocol, the data transmission nodes being in mutual communication with each other via a data transmission system for transmission of data between said components including transmission of said control commands to said plurality of controllable components, the data transmission nodes being connected to the relevant associated components through connection lines, wherein said data transmission system comprises a first wireless transmitter and a first wireless receiver serving a first group of one or more data transmission nodes, a second wireless transmitter and a second wireless receiver serving a second group of one or more data transmission nodes and a third wireless transmitter and a third wireless receiver serving a third group of one or more data transmission nodes, each of said wireless transmitters serving any particular group of nodes being positioned for simultaneous broadcast mode wireless communication with each of said wireless receivers serving any other group of nodes.

2. An X-ray device as claimed in claim 1, wherein the first and second and third wireless transmitters and first and second and third wireless receivers are light transmitters and light receivers.

3. An X-ray device as claimed in claim 2, wherein said first group of data transmission nodes comprises at least two nodes connected via a line bus system to said first wireless transmitter and first wireless receiver.

4. An X-ray device as claimed in claim 1, wherein the light transmitters and light receivers are infrared transmitters and infrared receivers.

5. An X-ray device as claimed in claim 4, wherein said first group of data transmission nodes comprises at least two nodes connected via a line bus system to said first wireless transmitter and first wireless receiver.

6. An X-ray device as claimed in claim 1, wherein said first group of data transmission nodes comprises at least two nodes connected via a line bus system to said first wireless transmitter and first wireless receiver.

7. An X-ray device as claimed in claim 1 wherein said at least one controllable component is a drive for patient positioning.

8. An X-ray device as claimed in claim 1 wherein each of said wireless transmitters serving any particular group of nodes is positioned for simultaneous broadcast mode wireless communication also with said wireless receiver serving said particular group of nodes.

* * * * *